(12) United States Patent
Hanson et al.

(10) Patent No.: US 10,055,740 B2
(45) Date of Patent: Aug. 21, 2018

(54) PAYMENT SELECTION AND AUTHORIZATION

(75) Inventors: Robert Hanson, Seattle, WA (US); Brad L. Seeley, Sammamish, WA (US)

(73) Assignee: Amazon Technologies, Inc., Reno, NV (US)

( * ) Notice: Subject to any disclaimer, the term of this patent is extended or adjusted under 35 U.S.C. 154(b) by 0 days.

(21) Appl. No.: 13/170,121

(22) Filed: Jun. 27, 2011

(65) Prior Publication Data
US 2012/0330787 A1    Dec. 27, 2012

(51) Int. Cl.
*G06Q 20/00* (2012.01)
*G06Q 30/00* (2012.01)

(52) U.S. Cl.
CPC ............. *G06Q 30/00* (2013.01); *G06Q 20/00* (2013.01)

(58) Field of Classification Search
CPC .................................................. G06Q 20/425
USPC ........................................................... 705/75
See application file for complete search history.

(56) References Cited

U.S. PATENT DOCUMENTS

| | | | |
|---|---|---|---|
| 5,513,250 A * | 4/1996 | McAllister | G06Q 20/04 379/207.03 |
| 5,991,750 A | 11/1999 | Watson | |
| 6,327,578 B1 | 12/2001 | Linehan | |
| 7,059,074 B1 * | 6/2006 | Calvete Zumalde | F41C 9/08 42/32 |
| 7,349,871 B2 * | 3/2008 | Labrou et al. | 705/26.35 |
| 7,959,074 B1 * | 6/2011 | Chopra et al. | 235/380 |
| 8,768,838 B1 | 7/2014 | Hoffman | |
| 2002/0035539 A1 | 3/2002 | O'Connell | |
| 2003/0008637 A1 | 1/2003 | Vatanen | |
| 2003/0126094 A1 | 7/2003 | Fisher et al. | |

(Continued)

FOREIGN PATENT DOCUMENTS

| | | |
|---|---|---|
| CN | 101990772 | 3/2011 |
| JP | 2002092320 | 3/2002 |

(Continued)

OTHER PUBLICATIONS

Office Action for U.S. Appl. No. 13/170,144, dated Oct. 26, 2017, Hanson, "Payment Selection and Authorization by a Mobile Device", 18 pages.

(Continued)

*Primary Examiner* — Chinedu Charles Agwumezie
(74) *Attorney, Agent, or Firm* — Lee & Hayes, PLLC (57) ABSTRACT

When making a payment with an electronic payment type, a user may provide additional verification of ownership through communications with the user's mobile computing device. For example, the user may swipe her bank card at a retailer's store. The retailer may authorize the bank card through an issuing party ("host"). The host may transmit a request to the user via a mobile application running on the mobile computing device, which may request the user to approve or decline the purchase request. In various embodiments, the host's request may require the user to enter personal and/or authorization information (e.g., a PIN, password, biometrics, etc.) via the mobile application to approve the request. In some aspects, the host may allow the user to split or allocate a payment amount across one or more electronic payment types available to the user from the host via the mobile application during the authorization process.

21 Claims, 9 Drawing Sheets

(56) References Cited

U.S. PATENT DOCUMENTS

| | | | |
|---|---|---|---|
| 2005/0250538 A1 | 11/2005 | Narasimhan et al. | |
| 2006/0202025 A1 | 9/2006 | Calabrese et al. | |
| 2007/0078760 A1* | 4/2007 | Conaty et al. | 705/39 |
| 2007/0156436 A1 | 7/2007 | Fisher et al. | |
| 2007/0198432 A1 | 8/2007 | Pitroda et al. | |
| 2008/0133351 A1* | 6/2008 | White et al. | 705/14 |
| 2009/0281944 A1 | 11/2009 | Shakkarwar | |
| 2010/0006642 A1 | 1/2010 | Boutcher et al. | |
| 2010/0063906 A1 | 3/2010 | Nelsen et al. | |
| 2010/0121767 A1* | 5/2010 | Coulter et al. | 705/67 |
| 2011/0035319 A1 | 2/2011 | Brand et al. | |
| 2011/0047075 A1* | 2/2011 | Fourez | G06Q 20/32 705/44 |
| 2011/0251950 A1 | 10/2011 | Ciurea | |
| 2011/0291814 A1* | 12/2011 | Faith | G01S 5/0226 340/10.5 |
| 2011/0295750 A1* | 12/2011 | Rammal | G06Q 20/12 705/44 |
| 2012/0030110 A1* | 2/2012 | Prakash et al. | 705/44 |
| 2012/0036013 A1* | 2/2012 | Neuhaus | G06Q 30/02 705/14.53 |
| 2012/0084210 A1 | 4/2012 | Farahmand | |
| 2012/0136752 A1* | 5/2012 | Gupta et al. | 705/26.8 |
| 2012/0166270 A1 | 6/2012 | Coppinger | |
| 2012/0173423 A1 | 7/2012 | Burdett et al. | |
| 2012/0197773 A1* | 8/2012 | Grigg | G06Q 40/00 705/35 |
| 2012/0233005 A1* | 9/2012 | White | G06Q 20/20 705/18 |
| 2012/0290468 A1* | 11/2012 | Benco | G06Q 20/3224 705/39 |
| 2013/0246203 A1* | 9/2013 | Laracey | G06Q 30/0253 705/21 |

FOREIGN PATENT DOCUMENTS

| | | |
|---|---|---|
| JP | 2003168063 | 6/2003 |
| JP | 2004110352 | 4/2004 |
| JP | 2005141503 | 6/2005 |
| JP | 2005174207 | 6/2005 |
| JP | 2006127174 | 5/2006 |
| JP | 2009043087 | 2/2009 |
| WO | WO2011040401 | 4/2011 |

OTHER PUBLICATIONS

Office action for U.S. Appl. No. 13/170,144, dated Apr. 12, 2016, Hanson et al., "Payment Selection and Authorization by a Mobile Device", 15 pages.

The Singapore Office Action dated Mar. 31, 2016 for Singapore patent application No. 201309398-4, a counterpart foreign application of U.S. Appl. No. 13/170,144, 6 pages.

Office Action for U.S. Appl. No. 13/170,144, dated Nov. 8, 2013, Robert Hanson, "Payment Selection and Authorization by a Mobile Device", 13 pages.

The Canadian Office Action dated Apr. 29, 2015 for Canadian patent application No. 2839150, a counterpart foreign application of U.S. Appl. No. 13/170,144, 4 pages.

Translated Japanese Office Action dated Feb. 24, 2015 for Japanese patent application No. 2014-518926, a counterpart foreign application of U.S. Appl. No. 13/170,144, 6 pages.

The Singapore Office Action dated Dec. 4, 2014 for Singapore patent application No. 201309398-4, a counterpart foreign application of U.S. Appl. No. 13/170,144, 8 pages.

Office Action for U.S. Appl. No. 13/170,144, dated May 30, 2017, Robert Hanson, "Payment Selection and Authorization by a Mobile Device", 24 pages.

The Canadian Office Action dated Sep. 8, 2016 for Canadian patent application No. 2839150, a counterpart foreign application of U.S. Appl. No. 13/170,144, 3 pages.

Translated Chinese Office Action dated Apr. 9, 2015 for Chinese patent application No. 201280032013.6, a counterpart foreign application of U.S. Appl. No. 13/170,144 , 15 pages.

The PCT Search Report and Written Opinion dated Sep. 5, 2012 for PCT application No. PCT/US2012/044246, 7 pages.

The Euopean Office Action dated May 10, 2017 for European patent application No. 12803927.8, a counterpart foreign application of U.S. Appl. No. 13/170,144, 6 pages.

The Extended European Search Report dated Oct. 30, 2014 for European Patent Application No. 12803927.8, 6 pages.

Translated Chinese Office Action dated Nov. 13, 2015 for Chinese patent application No. 201280032013.6, a counterpart foreign application of U.S. Appl. No. 13/170,144, 9 pages.

Final Office Action for U.S. Appl. No. 13/170,144, dated Apr. 18, 2014, Robert Hanson, "Payment Selection and Authorization by a Mobile Device", 16 pages.

Translated Japanese Office Action dated Oct. 27, 2015 for Japanese patent application No. 2014-518926, a counterpart foreign application of U.S. Appl. No. 13/170,144, 7 pages.

Translated Japanese Office Action dated Apr. 18, 2017 for Japanese Patent Application No. 2016-037781, a counterpart foreign application of U.S. Appl. No. 13/170,144, 7 pages.

* cited by examiner

PAYMENT SELECTION AND AUTHORIZATION

BACKGROUND

Many merchants allow customers to pay with credit cards, debit cards, and other types of bank cards or electronic accounts (e.g., gift cards, etc.). When customers use these types of payment types to fulfill a payment request, the merchant typically performs a verification process. The verification process often occurs electronically after an identifier is read from a card (e.g., via a swipe card reader, radio frequency identifier (RFID) reader, microchip reader, etc.). The verification process often contacts an issuer of the card or representative of the issuer to determine whether to approve a requested amount of the purchase request.

Some payment types use personal identification numbers (PINs) or other secret codes to protect against unauthorized use of the payment types. For example, at a point of sale (POS), a user may swipe her debit card using a swipe card reader and then enter an associated PIN on a keyboard of the card reader. The card reader and keyboard are typically exposed and visible to other people including a clerk, thus potentially compromising secrecy of the PIN. In some instances, such as at automated teller machines, the keypad is at least partially covered by a hood to prevent or limit visibility of the keypad by other users.

Often, people have multiple payment types, such as a collection of credit cards, debit cards, gift cards, and other cards or payment types. It can be inconvenient to carry multiple cards in a wallet. In addition, carrying multiple cards at once exposes a person to a large risk and/or inconvenience if the collection of cards is lost, misplaced, or stolen.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

DETAILED DESCRIPTION

Overview

This disclosure provides techniques and systems to enhance security, privacy, and convenience when using electronic payment types such as credit cards, debit cards, gift cards, or other types of electronic payments. When making a payment with an electronic payment type, a user may provide additional verification of ownership through communications with the user's mobile computing device (e.g., mobile phone, tablet computer, etc.). For example, the user may enter or swipe her credit card at a retailer's store (in person or online). The retailer may then process the credit card information through a gateway to verify whether the card is active, has adequate funds, and/or for other reasons. The gateway may forward a request to an issuing party ("host"). In accordance with various embodiments, the host may transmit a request to the user via a mobile application running on the mobile computing device, which may require the user to approve or decline the purchase request. In various embodiments, the host's request may require the user to enter personal and/or authorization information (e.g., a PIN, password, biometrics, etc.) via the mobile application to approve the request.

In some embodiments, the host may manage a collection of electronic payment types of the user. The host may allow the user to split or allocate a payment amount across various electronic payment types available to the user from the host via the mobile application during the authorization process. For example, the user may receive a request from the host, select a different card than the card initially provided to the merchant, and then accept the payment request. From the merchant's perspective, the payment may be processed using the payment type that was received by the merchant and initiated this process. However, the host may provide actual payment to the merchant using the payment type(s) selected by the user via the mobile application.

The techniques and systems described herein may be implemented in a number of ways. Example implementations are provided below with reference to the following figures.

Illustrative Environment

Figure 1:
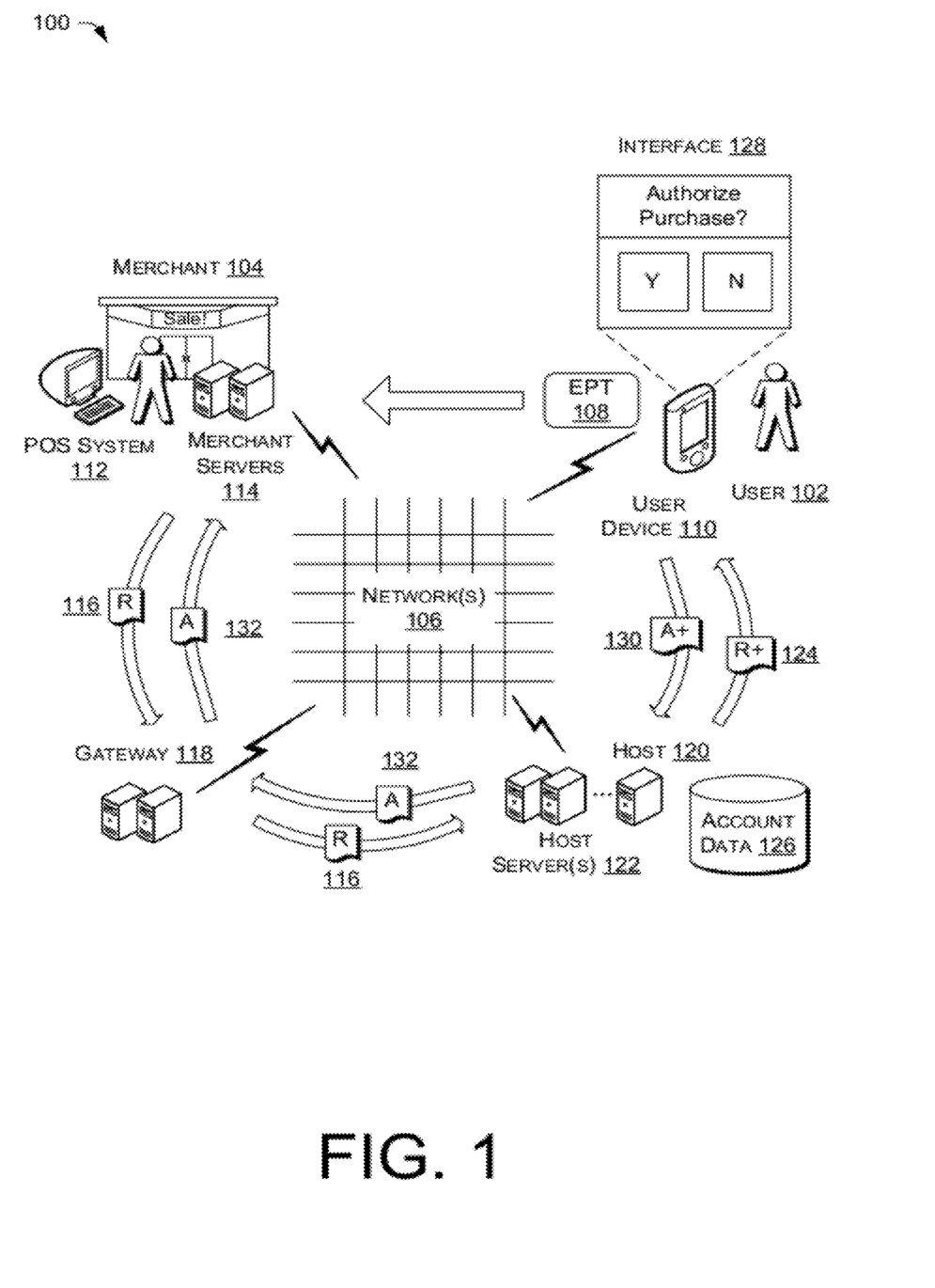
FIG. 1 is a schematic diagram of an illustrative computing environment to provide mobile payment selection and authorization.

FIG. 1 is a schematic diagram of an illustrative computing environment 100 to provide mobile payment selection and authorization. The environment 100 includes a user 102 that interacts with a merchant 104. The merchant 104 may have a brick and mortar location and/or an electronic marketplace that is accessible to the user 102 via one or more network(s) 106. For example, the electronic marketplace may be a website that enables the user 102 to purchase goods and/or services or a catalog-based service that allows the user to browse items sold, rented, leased, or otherwise made available from the merchant 104.

The merchant 104 may accept payment from the user 102 using an electronic payment types (EPT) 108 and may also accept other payment types (e.g., cash, personal checks, money orders, etc.). The EPT 108 is a payment instrument that may include bank cards such as credit cards and debit cards, as well as gift cards, stored value cards, or any other type of electronic payments. The EPT 108 may be processed through a chain of events discussed below to enable the user 102 to authorize use of an EPT 108 using a mobile computing device 110 ("user device"). The user device 110 may be a mobile telephone, a smart phone, a tablet computer, a laptop computer, a netbook, a personal digital assistance (PDA), a gaming device, a media player, or any other mobile computing device that includes connectivity to the network(s) 106 and enables user input.

After receipt of the EPT 108 from the user 102 via a point of sale (POS) system 112 and/or merchant servers 114 of the merchant 104, the merchant may transmit a request 116 for authorization to a gateway 118. The gateway 118 may be a representative financial institution of the merchant 104 and/or a routing entity that routes the request 116 from the merchant to a host 120 that is a party that issued the EPT 108 to the user 102 and/or manages an account of the EPT 108 for the user.

In accordance with one or more embodiments, the host 120 includes host servers 122 that may receive the request 116, process the request, and then transmit a modified request 124 to the user device 110 associated with the user 102. During the processing, the host servers 122 may retrieve information about the EPT 108 from account data 126 that is maintained by the host 120. The account data 126 may include rules for creating the modified request 124, options for the user 102, available electronic payment types for the user, stored user preferences, and other data pertaining to the EPT 108 and/or the user 102, which may be used to create the modified request 124.

The user device 110 may receive the modified request 124, typically shortly after the merchant 104 receives the identifier of the EPT 108. The modified request may be received by the user device 110 using a communication path different from a communication path used to transmit the EPT 108 to the merchant 104. The modified request 124 may be processed by a payment application running on the user device 110 that allows the user 102 to receive information and accept or decline the modified request 124, among other possible options, using a user interface 128. The payment application may generate an extended answer 130 (i.e., response), which is transmitted back to the host servers 122, again using a communication path different from a communication path used to transmit the EPT 108 to the merchant 104. The extended answer 130 may include an acceptance, a special code (e.g., a personal identification number (PIN), password, or other personal information), and possibly a selection related to designated electronic payment types (e.g., a selection of which EPT to use to satisfy the modified request 124). The host 120 may verify information in the extended answer 130, such as verify whether the PIN is correct and that the user accepts the request 116. The host servers 122 may then transmit an answer 132 to the gateway 118, which may be forwarded to the merchant servers 114 and/or the POS system 112 of the merchant 104 after a relatively short amount of time. Unlike the extended answer 130, the answer 132 may include less information and primarily pertain to an acceptance or decline of the payment request 116 rather than including the special code or other information directed to the host 120.

By using the EPT in conjunction with the user device 110, the user 102 may experience greater security against misuse of their EPT. For example, if the EPT 108 (or identifier of the EPT 108) is stolen and used to purchase an item from the merchant 104, or other merchants that employ the above discussed techniques, the user 102 can simply decline the purchase request to protect against a fraudulent purchase. In situations where the modified request asks for a PIN or other special code, the user 102 may be protected against unauthorized use even when the thief (or other unauthorized person) possesses the user device 110. In addition, by using the user device 110 to enter security codes, theft of the security code may be more difficult such as when the user interacts with an automated teller machine as is subject to a scam (e.g., card skimming, fake PIN pads, etc.).

In some embodiments, the merchant 104 may communicate directly with the host 120 and/or the host 120 may perform some or all operations of the gateway 118. Thus, in some embodiments the environment 100 may not include the gateway 118 without impacting the techniques described herein.

The network(s) 106 may include wired and/or wireless networks that enable rapid communications between the various computing devices described in the environment 100. In some embodiments, the network(s) may include local area networks (LANs), wide area networks (WAN), mobile telephone networks (MTNs), and other types of networks, possibly used in conjunction with one another, to facilitate communication between the various computing devices (i.e., the merchant servers 114, the host servers 122, and the user device 110). The computing devices are described in greater detail with reference to the following figures.

Figure 2A:
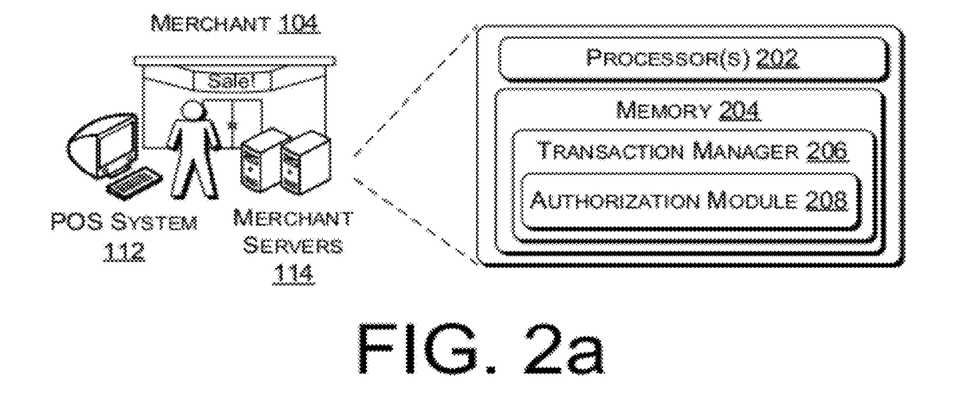
FIGS. 2a-2c are block diagrams of illustrative computing architecture of various components included in the computing environment of FIG. 1.
Figure 2B:
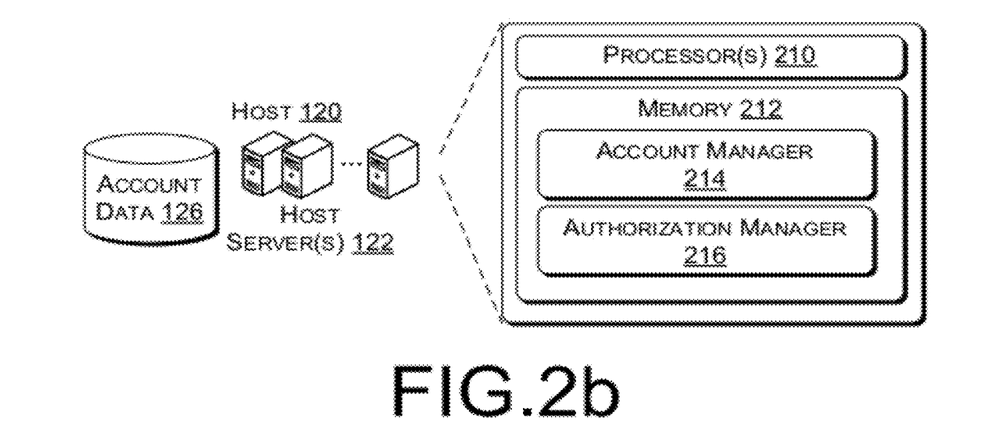
Figure 2C:
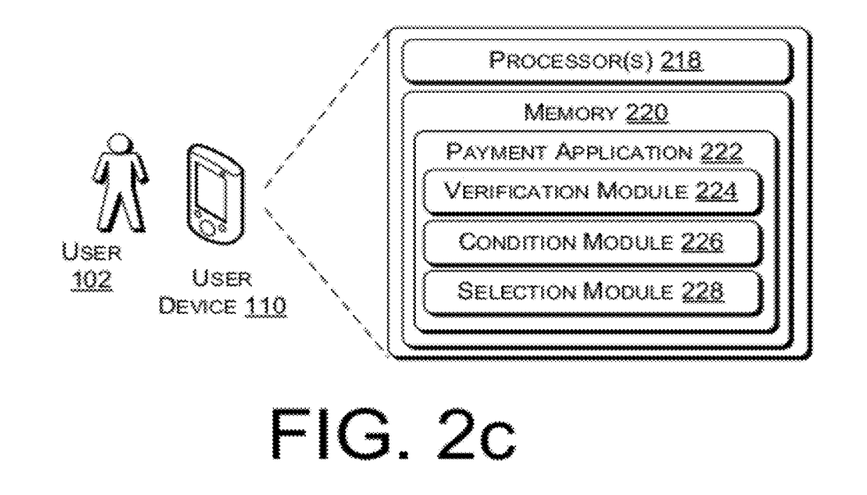

FIGS. 2a-2c shows illustrative computing architecture of the various computing devices included in the computing environment of FIG. 1.

FIG. 2a shows illustrative computing architecture of the merchant servers 114, the POS system 112, or both. The architecture may include processors(s) 202 and memory 204. The memory 204 may store various modules, applications, programs, or other data. The memory 204 may include instructions that, when executed by the processor(s) 202, cause the processors to perform the operations described herein for the merchant 104. In some embodiments, the memory 204 may store a transaction manager 206 and an authorization module 208, which may be part of the transaction manager or separate from the transaction manager. The transaction manager 206 may process a transaction with the user 102 and receive the EPT 108. The authorization module 208 may authorize the EPT 108 via the gateway 118 or directly through the host 120 as discussed above to determine whether the EPT is approved as indicated by the answer 132. In some embodiments, the transaction manager 206, the authorization module 208, or portions of each, may be distributed across multiple computing systems, such as the POS system 112 and the merchant servers 114.

FIG. 2b shows illustrative computing architecture of the host servers 122. The architecture may include processors(s) 210 and memory 212. The memory 212 may store various modules, applications, programs, or other data. The memory 212 may include instructions that, when executed by the processor(s) 210, cause the processors to perform the operations described herein for the host 120. In some embodiments, the memory 212 may store an account manager 214 and an authorization manager 216. The account manager 214 may manage the account data 126 that stores the various rules, settings, EPTs, and other data for each user that has an account with the host 120. The authorization manager 216 may process communications from the merchant 104, possibly via the gateway 118, to either accept or decline a payment request based at least in part on user interaction with the user device 110.

FIG. 2c shows illustrative computing architecture of the user device 110. The architecture may include processors(s) 218 and memory 220. The memory 220 may store various modules, applications, programs, or other data. The memory 220 may include instructions that, when executed by the processor(s) 218, cause the processors to perform the operations described herein for the user 102. In some embodiments, the memory 220 may store a payment application 222 that may interact with the authorization manager 216 and/or the account manager 214 of the host servers 122. The payment application 222 may further include a verification module 224, a condition module 226, and a selection module 228. Each module is discussed in turn.

In accordance with various embodiments, the verification module 224 may determine whether to generate a security code request (e.g., UI, etc.) for an authorization based on the modified request 124 received from the authorization manager 216 of the host servers 122. The verification module 224, when requested by the host servers 122 (or possibly by the payment application 222), may require the user to enter a security code, such as a PIN, a password, biometric data, or other personal information, to accept a payment request originated from the merchant 104 and transmitted through the host servers 122.

The condition module 226 may provide information about the user device 110, apply conditions for use of the security code and/or provide automatic approval or rejection of the modified payment request 124, or other pertain to other types of information. For example, the authorization manager 216 may request a location of the user device 110, which may be provided using global positioning system (GPS), triangulation, or other information. When this information matches the location of the merchant, a known location of the user 102 (e.g., at home, at work, etc.), or another specified or learned location, then the authorization manager 216 may adjust a response required by the user to accept the payment (e.g., remove the requirement of the security code, etc.).

The selection module 228 may enable the user 102 to select and allocate payments between other EPTs that are available to the user and stored in the account data 126. For example, the account data 126 may include an association between many different types of EPTs of the user, which may be accessible when any one of the EPTs is presented to the merchant 104. The host may then fulfill the payment request 116 by the merchant 104 using selected ones of the EPTs via the selection module 228. The user 102 may allocate funds between multiple EPTs based on percentages, payment amounts, or other allocations.

Illustrative Operation

Figure 3:
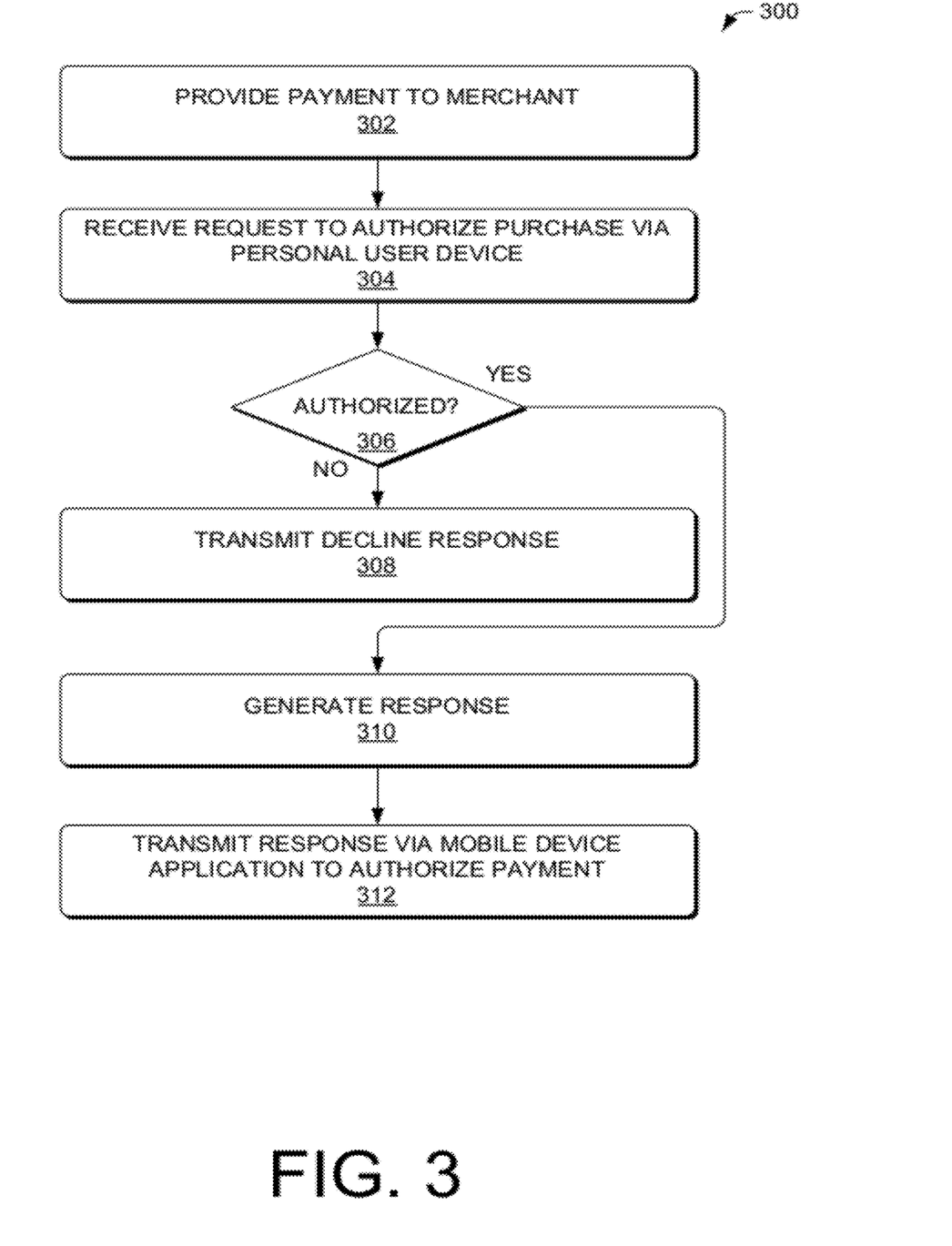
FIG. 3 is a flow diagram of an illustrative process to authorize a payment with a mobile device application.

FIG. 3 is a flow diagram of an illustrative process 300 to authorize a payment with a mobile device application. The process 300 is illustrated as a collection of blocks in a logical flow graph, which represent a sequence of operations that can be implemented in hardware, software, or a combination thereof. The collection of blocks is organized under respective entities that may perform the various operations described in the blocks. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the process. Other processes described throughout this disclosure, in addition to process 300, shall be interpreted accordingly.

The process 300 is described with reference to the environment 100 and may be performed by the user device 110 in cooperation with any one or more of the host servers 122, the POS system 112, and/or the merchant servers 114. Of course, the process 300 (and other processes described herein) may be performed in other similar and/or different environments.

At 302, the user 102 may provide a payment to the merchant 104 using the EPT 108. For example, the user 102 may interact with the merchant 104 at a brick and mortar location and submit the EPT directly to the merchant 104. The user may also interact with the merchant 104 through an electronic marketplace accessible using the network(s) 106. In some instances, the user may transfer the EPT 108 via a browser or application using the user device 110.

At 304, the user device 110 may receive a request (i.e., the modified request 124) to authorize the purchase using the payment application 222, which may be routed from the merchant servers 114 and through the gateway 118 and/or the host servers 122 to arrive at the user device 110. The payment application 222 may be different than the application that may be used to transfer the EPT 108 to the merchant (e.g., via a browser, etc.). The request may include additional information such as a requirement for a code, available electronic payment types, details of the request such as an amount due, items included in a transaction, and so forth.

At 306, the payment application 222 may determine to authorize or decline a payment based at least in part on input from the user 102 provided using the user device 110. When the user 102 decides to decline the payment, at 308 (following the "no" route), the payment application 222 may transmit a response to the host servers 122 to decline the payment. However, when the user decides to authorize the payment request (following the "yes" route from the decision operation 306), then the process 300 may continue at 310.

At 310, the payment application 222 may generate a response (or answer) to the request. The response may include selection of one or more EPT (including or different than the EPT used in the operation 302), which may be collected and/or processed by the selection module 228. The response may also include a code, such as a PIN, a password, biometric sensed data, or other personal information which may be collected and/or processed by the verification module 224. In some instances, the response may include a rejection command when the user 102 desires to reject the payment request. The response may also include condition information, such as a location of the user device 110, which may be collected and/or processed by the condition module 226.

At 312, the payment application may transmit the response and associated information to the host servers 122 of the host 120. The host servers 122 may then relay the response to the gateway 118 and/or to the merchant 104 when the response is correct, such as when the response satisfies the code and/or condition requirements included in the request from the host 120.

Figure 4:
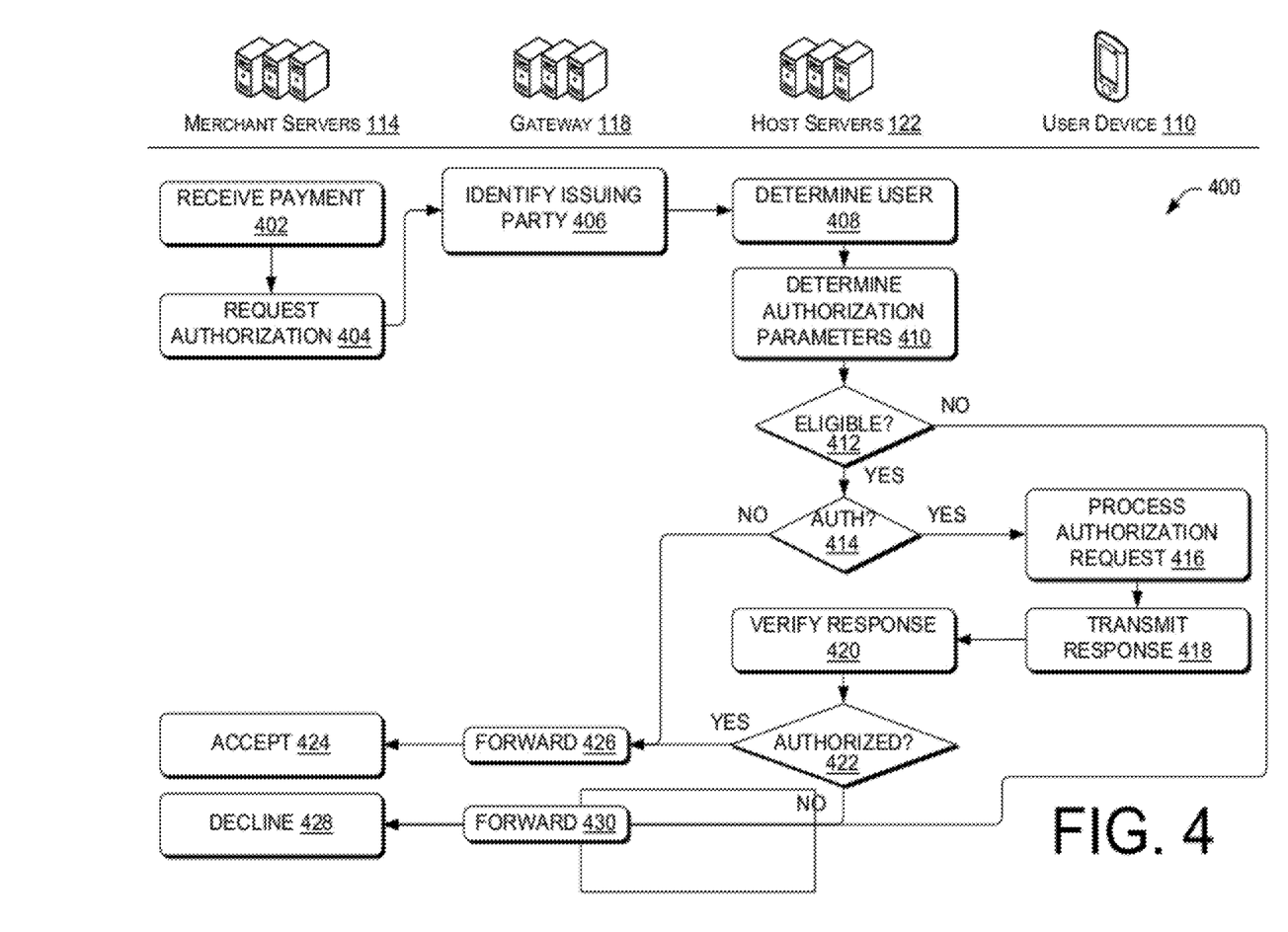
FIG. 4 is a flow diagram of an illustrative process showing interactions between various actors from the computing environment shown in FIG. 1.

FIG. 4 is a flow diagram of an illustrative process 400 showing interactions between various actors from the environment 100 shown in FIG. 1. The operations shown in the process 400 are shown under entities that may perform the respective operations; however, the operations may be performed by other entities, at least in part, in other configurations. For example, some or all of the operations designated under the merchant servers 114 may be performed by the POS system 112. The operations may include encryption/decryption of data for security of the information transmitted between each entity.

At 402, the merchant servers 114 may receive a payment via the EPT 108 from the user 102.

At 404, the merchant servers 114 may request authorization for the payment received at the operation 402 to verify funds, authenticate the electronic payment type, or for other reasons.

At 406, the gateway 118, which may be a representative financial institution of the merchant 104 or another entity, may identify an issuing party (i.e., the host 120) to authorize the payment.

At 408, the host servers 122, via the account manager 214, may determine the user 102 associated with the authorization message and payment from the operations 404 and 406. The host servers 122 may match an identifier number of the EPT 108 to the user 102 via the account data 126.

At 410, the host servers 122 may determine authorization parameters. The authorization parameters may be based on rules for authorization, such as purchases that are automatically authorized (e.g., white-listed, under a predetermined amount, etc.), or particular requirements for authorization (e.g., whether a security code is required in addition to an acceptance, etc.) to process a payment request.

At 412, the host servers 122 may determine whether the user is eligible to use the EPT 108. For example, the host servers 122 may determine whether the user's account has funds necessary to satisfy the payment and/or the host servers may perform various fraud checks to determine whether the request should be declined due to fraud risks. When the host servers 122 determine that the user is eligible to use the EPT, or other EPTs, and/or the fraud risk is acceptable (less than a threshold score, etc.) then processing may continue at 414.

At 414, when an authorization is required, then the host servers 122, via the authorization manager 216, may transmit a modified request (e.g., the modified request 124) to the user device 110 associated with the user 102. In some instances, the user 102 may delegate authorization or purchasing (use of the EPT) to another person, such as a family member, business partner, colleague, friend, etc. Therefore, the user 102 that operates the user device 110 may not necessarily be the user that presents the EPT 108 to the merchant 104.

At 416, the user device 110, via the payment application 222, may process the authorization message that includes the authorization parameters. For example, the payment application 222 may determine whether to request a code, via the verification module 224, determine a condition (e.g., a location of the user device, etc.) using the condition module 226, or perform other possible operations prior or during presentation of a request to the user 102. In addition, the user device 110, via the payment application 222, may enable the user 102 to select other or additional EPTs to fulfill the purchase initiated at the operation 402 using the selection module 228.

At 418, the user device 110 may transmit a response (answer) back to the host servers 122. The response may include at least one or more of an acceptance or decline, a code, designated EPT(s), and condition information.

At 420, the host servers 420, via the authorization module 216, may verify the response when the user accepts the payment. For example, the authorization module 216 may verify that the code is correct, the conditions are satisfied, and so forth, which may be performed using the account data 126.

At 422, the authorization module 216 may determine whether the response is authorized (i.e., accepted and correct), whether the user 102 has adequate funds for the payment, and whether the payment is unlikely to be fraudulent. When the response is authorized from the user and the information (e.g., the code, conditions, etc.) is correct or when no authorization is required from the decision operation 414, and when adequate funds are available on the risk of fraud is low (e.g., less than a threshold score, etc.), then an acceptance response may be transmitted to the merchant servers 114 at 424, which may be forwarded via the gateway at 426. When the response is declined from the user 102, the user lacks adequate funds, and/or the fraud risk is high, then a rejection (decline) response may be transmitted to the merchant servers 114 at 428, which may be forwarded via the gateway at 430. The payment may also be declined following the route "no" from the decision operation 414 when the host servers 122 determine that the user's accounts lack adequate funding and/or the payment is likely to be fraudulent based on predetermined factors prior to the authorization communication from the user 102 via the user device 110.

Figure 5:
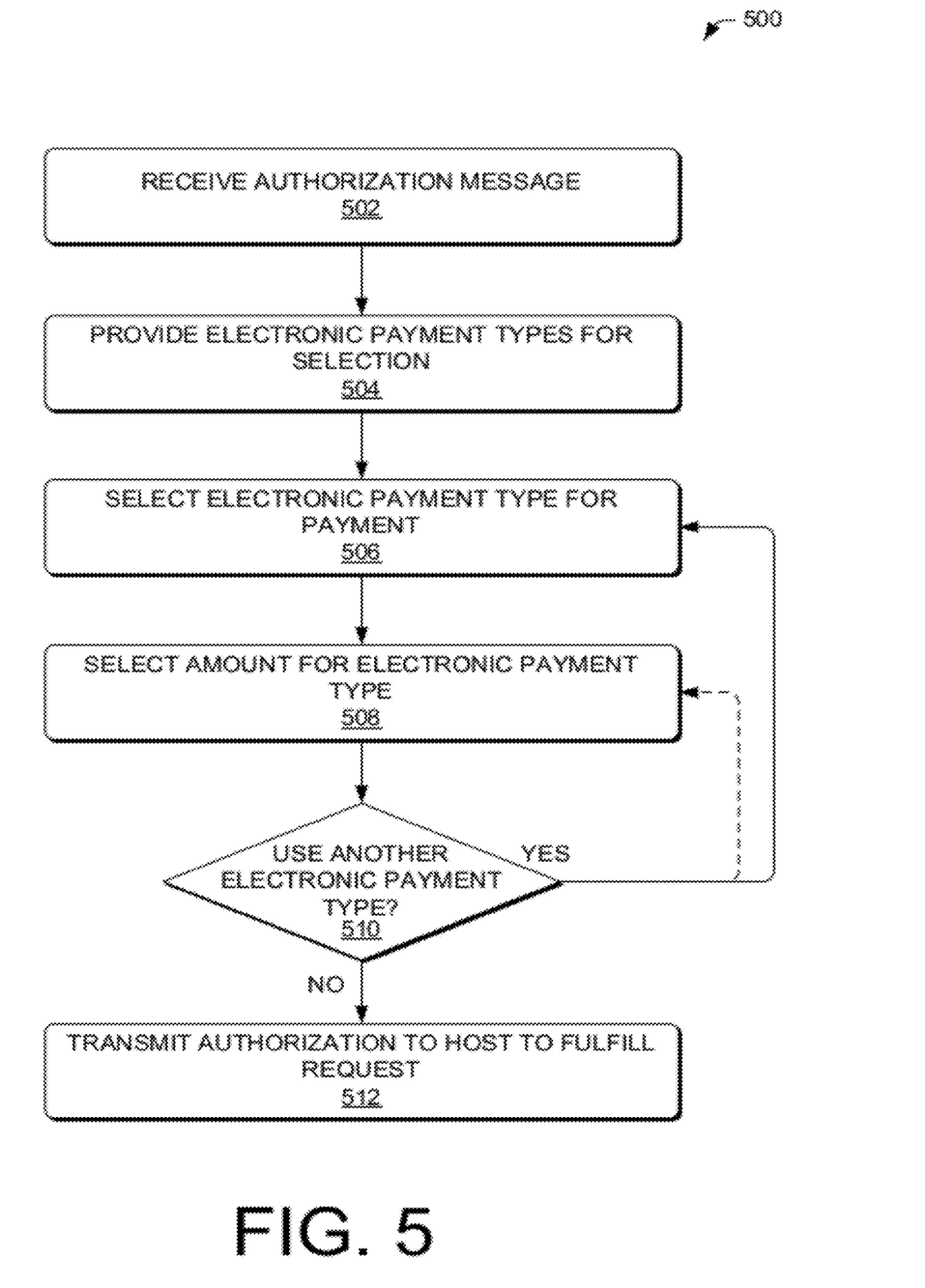
FIG. 5 is a flow diagram of an illustrative process to select an electronic payment type during a payment authorization.

FIG. 5 is a flow diagram of an illustrative process 500 to select an EPT during a payment authorization. Although the process 500 is described as being performed by the user device 110 via the payment application 222 in the discussion below, the process 500 may also be performed in part or in whole by the host servers 122 via the account manager 214 such as when a determination is selected based on rules stored in an the account data 126.

At 502, the payment application 222 may receive an authorization message. The authorization message may include an amount due, conditions, a requirement for a code, and/or other information.

At 504, the selection module 228 of the payment application 222 may provide EPTs for selection by the user 102, which may be different than the EPT 108 provided to the merchant 104 (e.g., at the operation 302).

At 506, the selection module 228 may receive a selection of an EPT to satisfy at least a portion of the payment due.

At 508, the selection module 228 may receive an amount (or percent, etc.) to be associated with the EPT selected at the operation 506.

At 510, the selection module 228 may determine whether additional EPTs are to be used or selected by the user 102. For example, if an amount due still remains after the selection at the operation 508, then the user 102 may be prompted to enter another EPT and/or another amount, which may direct the process back to the operation 506 (or the operation 508) following the "yes" route.

When no other EPTs are to be used, following the "no" route from the operation 510, then the payment application 222 may transmit authorization to the host at 512 to fulfill the authorization message from the operation 502.

In various embodiments, the payment application 222 may solicit financial information (e.g., balance information, etc.) from the host servers 122 to attempt to prevent an overdraft or passage of a credit limit of an EPT. When the payment application 222 determines that an overdraft is likely or possible, then the payment application may prompt the user and/or request use of another EPT at the decision operation 510.

In some embodiments, the account data 126 may include specific rules that select the EPT for the user. For example, the account data 126 may include a rule to use a specific EPT for a specified merchant. The specific EPT may be a credit card that includes additional rewards (points, miles, etc.) for the specified merchant. These rules may be created by the user, mined from historical transactions of the user 102, or otherwise created for the user. In some embodiments, a preferred EPT (or possibly multiple EPTs) may be preselected for the user by the account manager 214 and subject to the user's confirmation via the payment application 222, such as via a pre-selection process.

Figure 6:
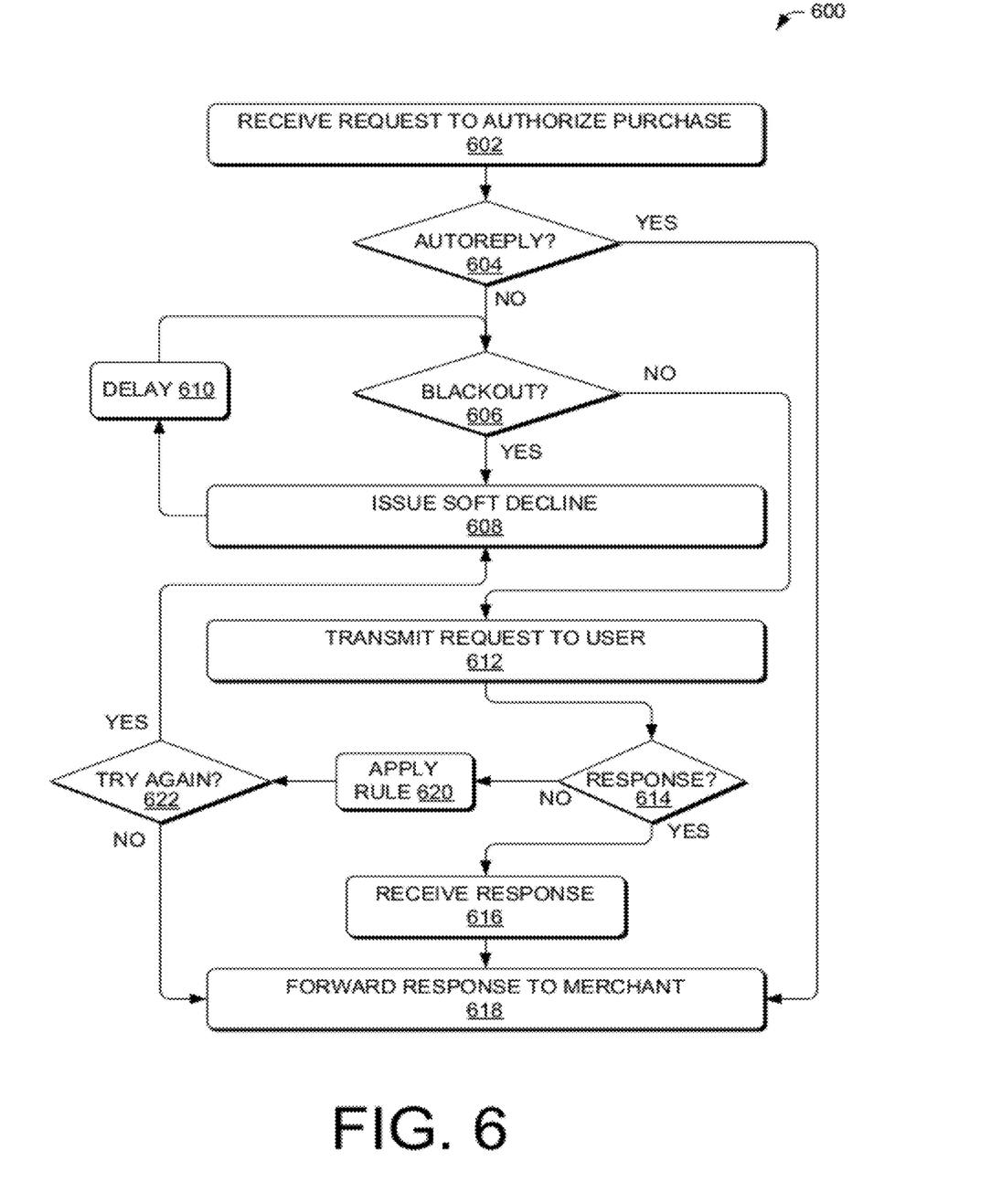
FIG. 6 is a flow diagram of an illustrative process to initiate a soft decline of a payment request.

FIG. 6 is a flow diagram of an illustrative process 600 to initiate a soft decline of a payment request. The soft decline may be used when the authorization process is requested during a blacked-out time (e.g., late a night, etc.) and/or when the user 102 is not responsive to a request. The process 600 may be performed by the host servers 122; however, other entities or computing devices may be used to implement the process.

At 602, the host servers 122 may receive a request to authorize a purchase originating at the merchant 104, and possibly relayed via the gateway 118.

At 604, the host servers 122, via the authorization manager 216, may determine whether a rule exists to enable an automatic reply to the purchase request without a communication to the user 102 via the user device 110. For example, the authorization manager 216 may use information provided by the account manager 214 to determine settings or rules stored in the account data 126 that determine whether to automatically reply to the request. The rules may indicate that some purchase amounts are automatically approved (e.g., under a threshold amount for a category, merchant, or generally, etc.), which may result in an automatic acceptance without interaction with the user 102 via the user device 110. The rules may also black list some purchase, which may result in an automatic decline without interaction with the user 102 via the user device 110. When the request is ineligible for an automatic reply, as determined by the decision operation 604, processing may continue at 606.

At 606, the authorization manager 216 may determine whether the request can be transmitted to the user 102 via the user device 110, possibly in accordance with rules or settings stored in the account data 126. For example, the user 102 may decide to blackout certain times from receiving authorization message, such as late at night through early morning (or other days, times, etc.). When the authorization manager 216 determines that the time is blacked out, then the authorization manager may issue a soft decline at 608, which may act as a temporary rejection to the request received at 602. In this event, the host server 122 may perform a delay at 610, and may again determine whether (after the delay) the blackout time has passed.

When here is no blackout at 606 (following the "no" route), then processing may continue at 612. At 612 the host servers 122 via the authorization manager 216 may transmit a request to the user 102 via the user device 110 for the payment application 222.

At 614, the host servers 122 may determine whether a response has been received from the user 102 within a predetermined amount of time. When a response is received within the predetermined amount of time, the response is received at 616 (which may precede the determination at the operation 614), and then forward the response to the merchant 104 (possibly via the gateway 118).

However, when the response is not received within the predetermined amount of time at 614 (following the "no" route), then the host server 122 via the authorization manager 216 may apply rule(s) at 620 to determine whether to try to contact the user again at 622. For example, the rules may instruct the host 120 to approve payment requests from approved merchants, up to a predetermined amount, and/or based on other criteria. Similarly, the rules may also instruct the host 120 to decline payment for various reasons specified in the rules. The rules may also indicate a number of attempts for the host 120 to perform before determining not to try again at the decision operation 622. When the authorization manager 216 tries again at the decision operation 622, processing may resume at the operation 608 by issuing a soft decline and then proceed to through the delay at the operation 610 as discussed above and shown in FIG. 5.

When the decision at the operation 622 is to not try again, such as when a limit is reached or exceeded per the rules or for other reasons included in the rules, then the authorization manager 216 may determine a response using the rules from the operation 620 to either fulfill the payment request or decline the payment request. The response may then be forwarded to the merchant at 618, possible via the gateway 118.

Figure 7:
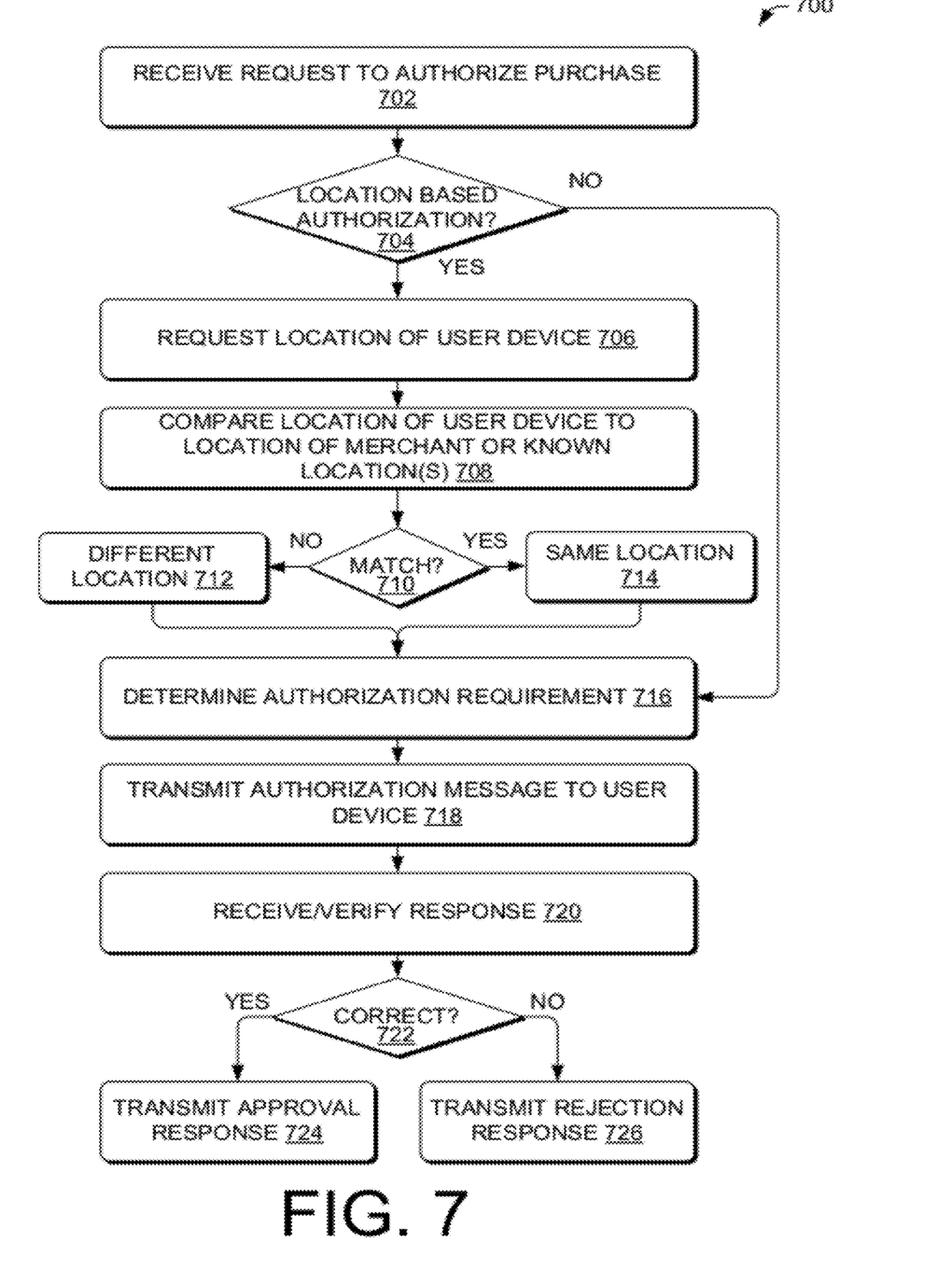
FIG. 7 is a flow diagram of an illustrative process to select an authorization type for use by a mobile device application.

FIG. 7 is a flow diagram of an illustrative process 700 to select an authorization type for use by a mobile device application. The process 700 may be performed by the host servers 122; however, other entities or computing devices may be used to implement the process. The process 700 may operate in cooperation with the condition module 226 of the payment application 222 residing on the user device 110. As discussed below, the process 700 is described with reference to a condition that is associated with a location of the user device 110; however, other conditions may be implemented using the process 700.

At 702, the host servers 122 may receive a request to authorize a purchase.

At 704, the host servers 122 may determine whether the authorization is subject to a condition, such as a location of the user device 110 relative to the location of the merchant 104. When the authorization is subject to the condition at the decision operation 704, following the "yes" route, then processing may continue at 706.

At 706, the host servers 122 may request a location of the user device 110 via the condition module 226, which may obtain the location (or other information), such as via a GPS receiver in the user device 110.

After receipt of the condition information from the user device 110, at 708, the host servers 122 may compare the location of the user device 110 to the location of the merchant 104 or to known locations associated with the user 102 (e.g., the user's home, office, frequently visited locations, etc.). At 710, the host servers 122 may determine based on the comparison whether the device's location matches the merchant's location or a known location. A non-match may be recorded at 712 while a match may be recorded at 714.

At 716, the host servers 122, via the authorization manager 216, may determine an authorization requirement. In some embodiments, the authorization may be based on the results (i.e., the operations 712 and 714). The determination may include other relevant factors. For example, a relevant factor may include whether the payment is for a remote transaction (e.g., online, telephone-based, etc.) or an arm's length transaction in a brick and mortar location. In the latter situation, a match of the user device's location and the merchant's location (the operation 714) may result in a lessened authorization process (simplified or none). In the former situation (remote transaction), the location of the user device 110 may be compared to known and/or frequent locations (home, work, school, etc.), which may then be used to select an authorization process. For example, a more difficult authorization process (e.g., including a request for a code) may be used when the user device 110 is located in an unknown location (e.g., not at home, etc.).

At 718, the host servers 122, via the authorization manager 216, may transmit an authorization message to the user device.

At 720, the host servers 122, via the authorization manager 216, may receive and verify the response. When the response is approved and correct (e.g., correct code is received (if requested), etc.) at 722 (following the "yes" route), then the host servers 122 may transmit an approval to the merchant at 724, possibly via the gateway 118. When the response is declined or possible when the code is incorrect or after excessive delay (e.g., operation 620 of FIG. 6) at 722 (following the "no" route), then the host servers 122 may transmit a rejection to the merchant at 726, possibly via the gateway 118.

In some embodiments, the location information determined from the operations 708-714 may be used as another checkpoint by the host servers 122 to determine whether to fulfill a payment request. For example, the process 700 may include transmitting the authorization message 718 to the user device 110 before or concurrently with the request for the location information. The operation 720 may use the information from operations 712-714 to determine whether to possibly override a decision of the user to approve the payment. For example, when the host servers 122 determine that the locations are different at 712 and that fraud is likely (e.g., someone has stolen the user device 110, etc.), then the host servers 122 may decline the payment even when the authorization message is received from the user device 110 with an intent to approve the payment and includes a correct code (if requested).

Illustrative Interfaces

Figure 8:
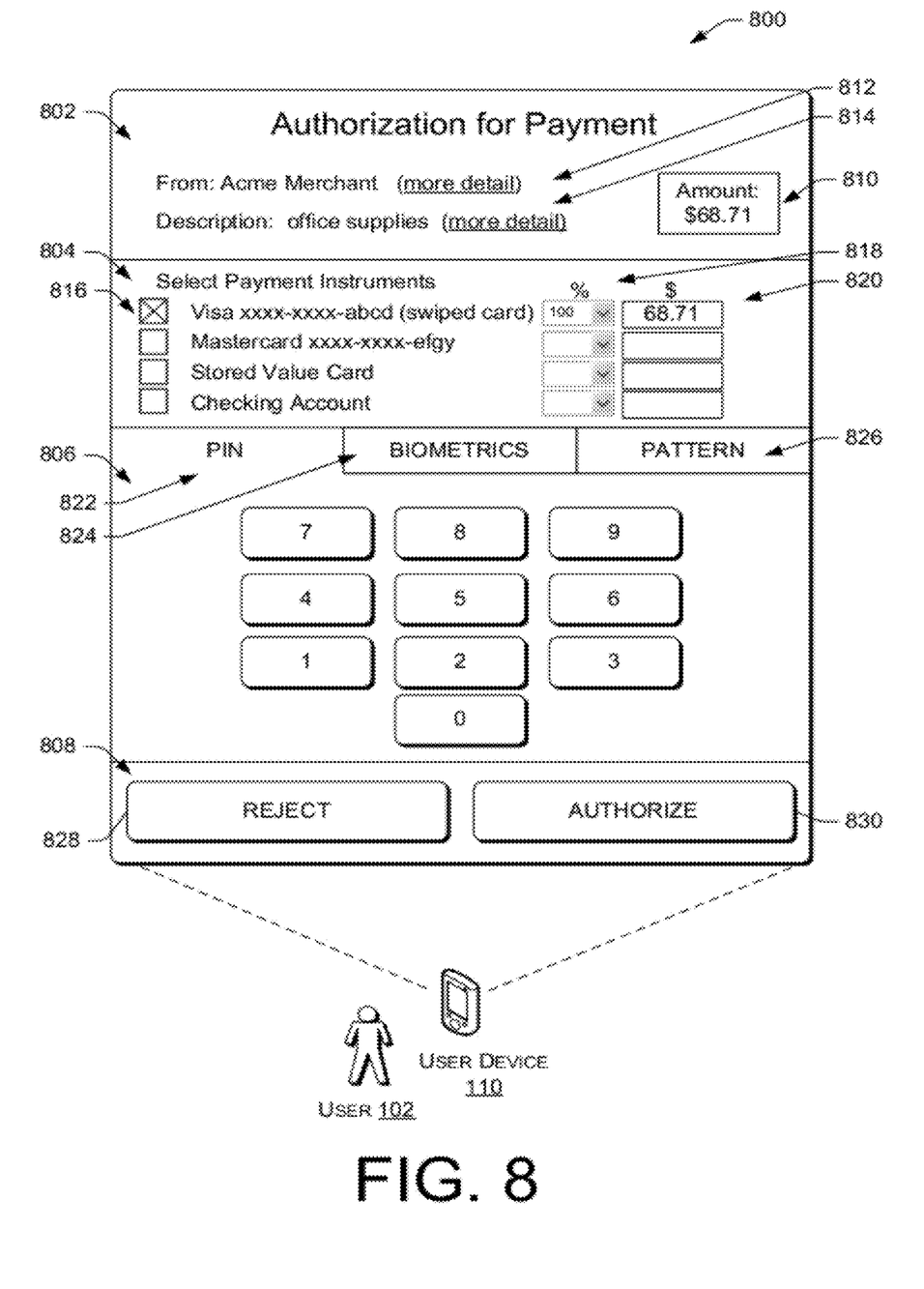
FIG. 8 is an illustrative user interface (UI) that enables payment selection and authorization.

FIG. 8 is an illustrative user interface (UI) 800 that enables payment selection and authorization. The UI 800 may be presented to the user 102 via the payment application 222 running on the user device 110. The UI 800 may include an information section 802, a payment selection section 804, a code section 806, a decision section 808, or any combination thereof. Each section is discussed in turn.

The information section 802 may provide an amount due 810 and possibly a description of the payment transaction, such as an identifier of the merchant 812 and/or a description 814, which may list items/services of the payment transaction or other details. In some embodiments, the descriptions may include a link to more information.

The payment selection section 804 may be populated in part by the selection module 228 and include options in accordance with the process 500 shown in FIG. 5. The payment selection section 804 may include EPTs 816 that are available to the user base at least in part on information in the account data 126 accessible to the host servers 122. In addition, the payment selection section 804 may include selections of amounts to include for each of the EPTs 816, such as a percent of the purchase amount 818 and/or an amount due 820. Illustrative data is shown in FIG. 8 showing an entry of 100% of the purchase amount for a first EPT. In some embodiments, this may be populated by the selection module 228 as a default entry as a convenience for the user 102. The selection module 228 may create the default entry based on rules, such as rules stored in the account data that create preferences for particular EPTs for some merchants or product categories, such as to enable the user to obtain extra rewards from the respective EPTs.

The code section 806 may include one or more options to enter a code, when required by an authorization message. In some instances, multiple options may be included in the code section as shown in FIG. 8. However, in some instances the code section 806 may only allow certain types of codes, such as a PIN 822, biometrics 824, a pattern 826, or other types of codes.

The decision section 808 may include a rejection command 828 to reject the payment request and an accept command 830 to accept the payment request. In some embodiments, when no code is required, the code section 806 may be omitted, grayed out, or otherwise made unavailable. In this situation, the user may only have to select the accept command 830 to authorize the requested payment.

The UI 800 may also include additional information. For example, it may contain a personal message (via text, audio, video, etc.) from a user that initiates the payment when the user is other than the user 102 receiving the message via the UI 800 (e.g., delegate is using EPT on behalf of authorizing user 102, etc.).

Figure 9:
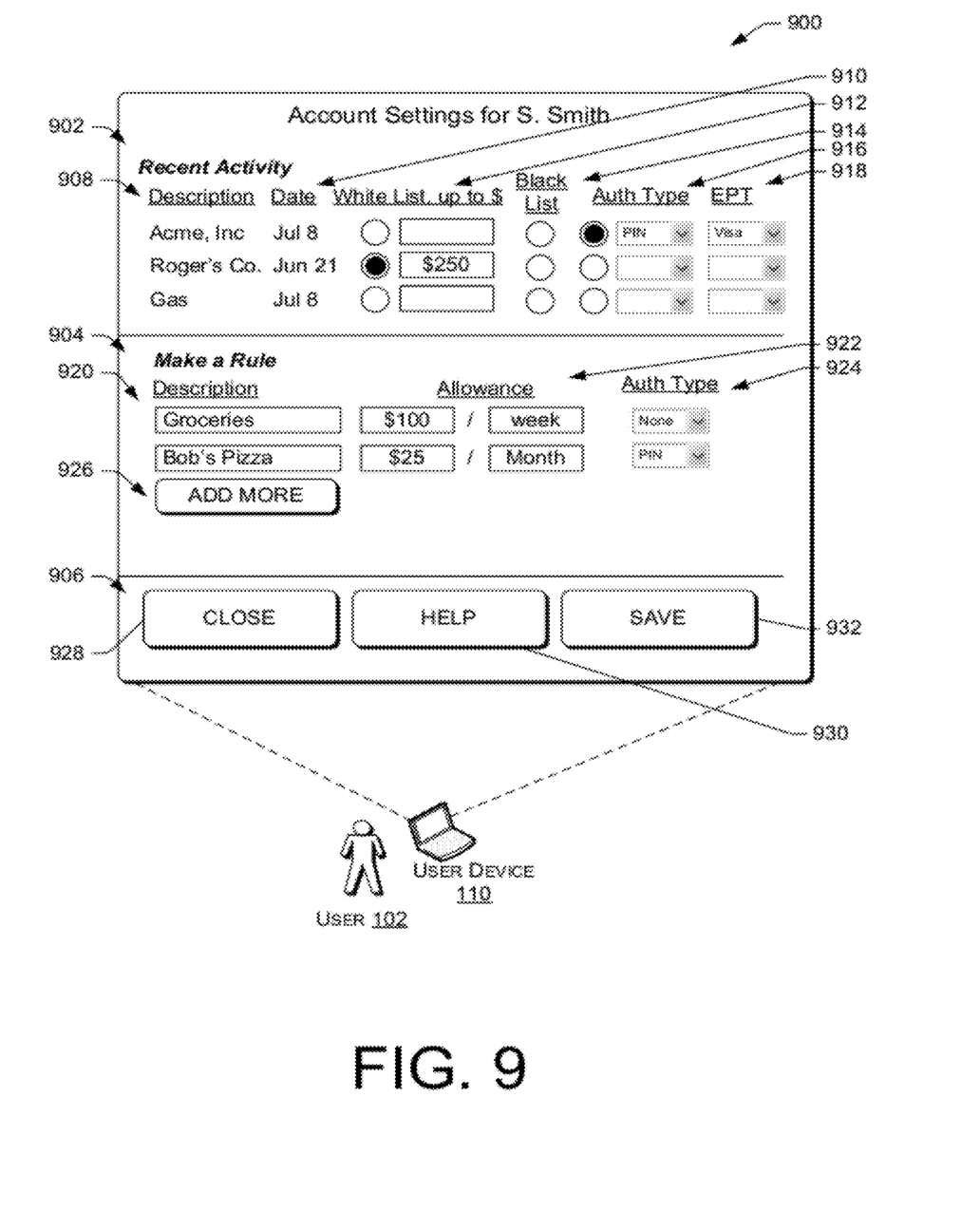
FIG. 9 is an illustrative UI that enables management of authorization messages from a host.

FIG. 9 is an illustrative UI 900 that enables management of authorization messages from a host. The UI 900 may be presented to the user 102 via the account manager 214 served by the host servers 122 and accessible via a user device (e.g., the user device 110 or another computing device). The UI 900 may include a recent activity section 902, a rule section 904, a menu section 906, or any combination thereof. Each section is discussed in turn.

The recent activity section 902 may include previous transactions that may allow the user 102 to easily make rules for future occurrences of transactions or similar transactions. The recent activity section 902 may include an entity designator 908 and date 910 of a transaction. For each transaction, the recent activity section 902 may include a white-list option 912 to automatically approve an authorization message from the entity, category, genre, etc., which may include up to a specified transaction amount per designated time period (e.g., $50 a week, $100 a transaction, etc.). The options may also include a black-list option 914 to automatically decline an authorization message for the entity, category, genre, etc. In addition, the recent activity section 902 may allow the user 102 to select a type of authorization 916 for the entity, category, and/or genre. In some embodiments, the recent activity selection may also enable the user 102 to associate an EPT with the entity, category, and/or genre using an EPT selector 918.

The rule section 904 may enable the user 102 to create rules which may be applied to automatically accept or reject authorization messages. The rules may include a description 920, an allowance 922, and/or an authorization type 924. For example, the allowance 922 may include a time period. The rule section 904 may include an "add more" command 926 to add additional rules. The user may also be able to delete rules or otherwise manage rules via the UI 900.

The menu section 906 may include commands to enable the user to navigate the UI 900. The commands may include a close command 928, a help command 930, and/or a save command 932 that saves the information obtained by the UI 900 in the account data 126 for use by the host servers 122.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

What is claimed is:

1. A method, comprising:
receiving, by one or more computing devices, one or more predetermined rules for payment authorization from a mobile device, the one or more predetermined rules including a time threshold, wherein at least one computing device of the one or more computing devices includes an authorization manager;

receiving, by the one or more computing devices, a request to authorize a payment from a merchant device, the request including at least a payment identifier and an amount of a transaction;

receiving, by the at least one computing device, the request;

executing, by the at least one computing device, the authorization manager;

identifying, by the at least one computing device via the authorization manager, the mobile device with the payment identifier;

associating, by the at least one computing device via the authorization manager, a plurality of known locations with the mobile device based at least in part on the identifying the mobile device;

determining, by the at least one computing device via the authorization manager, a current location of the mobile device;

comparing, by the at least one computing device via the authorization manager, the current location of the mobile device with the plurality of known locations;

determining, by the at least one computing device via the authorization manager, an authorization requirement, the authorization requirement including the one or more predetermined rules and at least one requirement prompting additional verification information associated with the mobile device;

determining, by the at least one computing device via the authorization manager, that the mobile device is unavailable to receive an authorization message at a current time based at least in part on the current time being within the time threshold;

transmitting, by the one or more computing devices, a first message to the merchant device based on the one or more predetermined rules;

determining, by the at least one computing device via the authorization manager, a delay for a second message transmission based the time threshold;

determining, by the at least one computing device via the authorization manager, that the delay has expired and transmitting the authorization message to the mobile device, wherein the authorization message includes a first prompt and a second prompt;

receiving, by the one or more computing devices, a user response via the mobile device corresponding to the first prompt and the second prompt;

determining, by the at least one computing device via the authorization manager, that the user response corresponding to the first prompt satisfies the at least one requirement of the authorization requirement;

transmitting, by the one or more computing devices, a response to the merchant device including an acceptance of the payment based at least in part on the user response corresponding to the second prompt; and transferring, by the one or more computing devices, the amount of the payment to an account of a merchant associated with the merchant device.

2. The method as recited in claim 1, wherein the additional verification information includes biometric data.

3. The method as recited in claim 1, wherein the authorization requirement includes an additional rule that indicates that the payment is to be declined utilizing a black list or to be accepted utilizing a white list.

4. The method as recited in claim 1, wherein the authorization requirement includes an additional rule prompting additional user input of biometric data, in response to determining that the mobile device is located at one of the plurality of known locations associated with the mobile device.

5. The method as recited in claim 1, wherein the plurality of known locations associated with the mobile device includes at least one of a home address associated with the mobile device, a work address associated with the mobile device, or a school address associated with the mobile device.

6. A method, comprising:

receiving, by one or more computing devices, a request to authorize a payment from a merchant device, the request including at least a payment identifier and an amount of a transaction, wherein at least one computing device of the one or more computing devices includes an authorization manager;

retrieving, by the one or more computing devices, one or more predetermined rules for payment authorization from user data associated with the payment identifier, the one or more predetermined rules including a time threshold;

receiving, by the at least one computing device, the request;

executing, by the at least one computing device, the authorization manager;

identifying, by the at least one computing device via the authorization manager, a mobile device with the payment identifier;

associating, by the at least one computing device via the authorization manager, a plurality of known locations with the mobile device based at least in part on the identifying the mobile device;

determining, by the at least one computing device via the authorization manager, a current location of the mobile device;

comparing, by the at least one computing device via the authorization manager, the current location of the mobile device with the plurality of known locations;

determining, by the at least one computing device via the authorization manager, an authorization requirement, the authorization requirement including the one or more predetermined rules and at least one requirement prompting additional verification information associated with the mobile device;

determining, by the at least one computing device via the authorization manager, that the mobile device is unavailable to receive an authorization message at a current time being within the time threshold;

determining, by the at least one computing device via the authorization manager, a delay for a message transmission based the time threshold;

determining, by the at least one computing device via the authorization manager, that the delay has expired and transmitting the authorization message to the mobile device, wherein the authorization message includes a first prompt, a second prompt, and a third prompt;

receiving, by the one or more computing devices, a user response via the mobile device corresponding to the first prompt, the second prompt, and the third prompt;

determining, by the at least one computing device via the authorization manager, that the user response corresponding to the first prompt satisfies the at least one requirement of the authorization requirement; and transmitting, by the one or more computing device, a response to the merchant device including an acceptance of the payment based at least in part on the user response corresponding to the second prompt and the third prompt.

7. The method as recited in claim 6, further comprising causing the amount of the payment to be transferred to an account of the merchant device in response to the transmitting the response to the merchant device including the acceptance of the payment.

8. The method as recited in claim 6, wherein the receiving the user response corresponding to the first prompt, the second prompt, and the third prompt is performed in communication with a payment application that is different than an application used to transmit the payment to the merchant device.

9. The method as recited in claim 1, wherein the authorization message to the mobile device includes a third prompt enabling a selection of an electronic payment type, and further comprising:
    requesting financial data associated with the electronic payment type;
    determining that the electronic payment type has sufficient funds to accommodate an amount of the transaction; and
    wherein transmitting the response to the merchant device including the acceptance of the payment is further based at least in part on determining that the electronic payment type has sufficient funds to accommodate the amount of the transaction.

10. The method as recited in claim 6, wherein the at least one requirement includes at least one of white listing or black listing a merchant in association with a threshold payment amount for a specified period of time.

11. The method as recited in claim 6, wherein the user response that corresponds to the third prompt includes a selection of an electronic payment type other than a payment type having the payment identifier, the electronic payment type to be used to satisfy at least a portion of the amount due to a merchant for the transaction.

12. The method as recited in claim 6, further comprising:
    before transmitting the authorization message, transmitting an initial message to the merchant device to at least temporarily reject the payment.

13. The method as recited in claim 6, further comprising:
    determining that the mobile device is unavailable to receive the authorization message at a current time based at least in part on the one or more predetermined rules, the one or more predetermined rules further including a number of attempts to transmit the authorization message to the mobile device; and
    delaying transmission of the authorization message to the mobile device when the mobile device is unavailable to receive the authorization message at the current time based at least in part on the one or more predetermined rules.

14. The method as recited in claim 6, wherein the third prompt enables a selection that corresponds to allocating portions of the amount of the payment across two or more different electronic payment types and at least one of the different electronic payment types is determined based at least in part on electronic payment types used in previous transactions between the merchant device and the mobile device.

15. The method as recited in claim 6, wherein the additional verification information includes at least one of a personal identification code (PIN), biometric data, a password, or a pattern.

16. One or more non-transitory computer-readable storage media storing computer-executable instructions that, when executed on one or more processors, performs acts comprising:
    receiving a request to authorize a payment from a merchant device, the request including at least a payment identifier and an amount;
    retrieving one or more predetermined rules for payment authorization from account data associated with the payment identifier, the one or more predetermined rules including a time threshold;
    executing an authorization manager based at least in part on the retrieving the one or more predetermined rules;
    identifying, via the authorization manager, a mobile device with the payment identifier;
    determining, via the authorization manager, a current location of the mobile device;
    determining, via the authorization manager, that the current location of the mobile device is located at one of a plurality of known locations;
    determining, via the authorization manager, an authorization requirement including includes the one or more predetermined rules and at least one requirement prompting biometric data of a user associated with the mobile device;
    determining, via the authorization manager, that the mobile device is unavailable to receive an authorization message at a current time based at least in part on the current time being within the time threshold;
    determining, via the authorization manager, a delay for a message transmission based on the time threshold;
    determining, via the authorization manager, that the delay has expired and transmitting the authorization message to the mobile device, wherein the authorization message includes a first prompt, a second prompt, and third prompt;
    receiving a user response via the mobile device corresponding to the first prompt, the second prompt, and the third prompt;
    determining, via the authorization manager, that the user response corresponding to the first prompt satisfies the authorization requirement; and
    transmitting a response to the merchant device including an acceptance of the payment based at least in part on the user response corresponding to the second prompt and the third prompt.

17. The one or more non-transitory computer-readable storage media as recited in claim 16, wherein the authorization message is a second authorization message; and
    wherein the acts further comprise transmitting a first authorization message to the mobile device prior to the second authorization message, the first authorization message comprising a soft decline notification to the merchant device to at least temporarily reject the payment prior to transmitting the second authorization message to the mobile device.

18. The one or more non-transitory computer-readable storage media as recited in claim 16, wherein the acts further comprise:
    determining that the mobile device is unavailable to receive the authorization message at a current time based at least in part on predetermined rules; and delaying transmission of the authorization message to the mobile device when the mobile device is unavailable to receive the authorization message at the current time based at least in part on the predetermined rules.

19. The one or more non-transitory computer-readable storage media as recited in claim 16, wherein the user response that corresponds to the third prompt includes a selection of a second electronic payment type that is different than a first electronic payment type associated with the payment identifier, and wherein the acts further comprising transacting a payment to the merchant device using the first and second electronic payment types.

20. The one or more non-transitory computer-readable storage media as recited in claim 16, wherein the authorization requirement includes an additional rule that selects an authentication process based at least in part on an amount of payment and a merchant associated with the merchant device, wherein at least one selection of the authentication process includes requesting a personal identification number (PIN) associated with the mobile device.

21. The one or more non-transitory computer-readable storage media as recited in claim 16, wherein the acts further comprise:
   determining that the mobile device is unavailable to receive the authorization message at a current time; and
   attempting to transmit the authorization message to the mobile device at a time after the current time based at least in part on predetermined rules, the predetermined rules indicating a number of attempts to transmit the authorization message to the mobile device.

* * * * *